United States Patent
Moore et al.

(10) Patent No.: US 9,160,024 B1
(45) Date of Patent: Oct. 13, 2015

(54) GRAFTING OF BIOMOLECULES ONTO MICROBIAL FUEL CELLS

(75) Inventors: Mary E. Moore, Huntsville, AL (US); Yolanda Meriah Arias-Thode, San Diego, CA (US); Brett R. Goldsmith, Coronado, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 762 days.

(21) Appl. No.: 13/530,781

(22) Filed: Jun. 22, 2012

(51) Int. Cl.
*H01M 8/16* (2006.01)

(52) U.S. Cl.
CPC ............... *H01M 8/16* (2013.01); *Y02E 60/527* (2013.01)

(58) Field of Classification Search
CPC .............................. H01M 8/16; Y02E 60/527
USPC .......................... 429/401, 502, 521, 530, 525
See application file for complete search history.

(56) References Cited

U.S. PATENT DOCUMENTS

| | | | |
|---|---|---|---|
| 5,866,133 A | 2/1999 | Kim et al. | |
| 2009/0136827 A1* | 5/2009 | Minteer et al. | 429/43 |
| 2009/0297890 A1* | 12/2009 | Shimomura et al. | 429/2 |
| 2010/0216037 A1 | 8/2010 | Jana et al. | |
| 2012/0142088 A1* | 6/2012 | Hsiao et al. | 435/325 |

OTHER PUBLICATIONS

Rezaei et al. "Analysis of chitin particle size on maximum power generation, power longevity, and Coulombic efficiency in solid-substrate microbial fuel cells." Journal of Power Sources, 192, 304-309 (2009).

Rezaei et al. "Substrate-enhanced microbial fuel cells for improved remote power generation from sediment-based systems." Environmental Science and Technology, 41, 4053-4058 (2007).

Du, Ling. "Highly conductive epoxy/graphite polymer composite bipolar plates in proton exchange membrane (PEM) fuel cells." Ph.D. Dissertation. The University of Akron. May 2008.

Du et al. "Highly conductive epoxy/graphite composites for bipolar plates in proton exchange membrane fuel cells." Journal of Power Sources, 172, 734-741 (2007).

Du et al. "Hygrothermal effects on properties of highly conductive epoxy/graphite composites for applications as bipolar plates." Journal of Power Sources, 182, 223-229 (2008).

(Continued)

*Primary Examiner* — Patrick Ryan
*Assistant Examiner* — Ben Lewis
(74) *Attorney, Agent, or Firm* — SSC Pacific Patent Office; Arthur K. Samora; Kyle Eppele

(57) ABSTRACT

A method for enhancing a microbial environment for a fuel cell can include the initial step of oxidizing the outer surface of the fuel cell anode to establishing reactive chemical functional groups. The anode surface can be oxidized by washing the anode with a solution of 4-carboxybenzene diazonium tetrafluoroborate, followed by washing with acetone, methanol and water. Once the anode surface has been oxidized, the methods can include the step of binding a surface graft matrix to the reactive chemical functional groups (the activated carboxyl groups on the anode surface). EDAC and sulfo-NHS can be used as a surface graft matrix, to bind to the activated carboxyl groups. A biological substance, such as a biological agent or biomolecule, can be chemically attached to the outer terminal reactive groups of the surface graft matrix. The result is a microbial fuel cell with increased power generation and durability properties.

10 Claims, 4 Drawing Sheets

(56) References Cited

OTHER PUBLICATIONS

Pauliukailte et al. "Comparative study of different cross-linking agents for the immobilization of functionalized carbon nanotubes within chitosan film supported on a graphite-epoxy composite." Analytical Chemistry. Jul. 1, 2009.

Sugawara et al. "Sensitivity of a glassy carbon electrode covered with a chitin film improved by the addition of a carbon powder." Analytical Sciences, 25, 105-108 (2009).

* cited by examiner

GRAFTING OF BIOMOLECULES ONTO MICROBIAL FUEL CELLS

FEDERALLY-SPONSORED RESEARCH AND DEVELOPMENT

This invention (Navy Case No. 101166) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-5118; email ssc_pac_T2@navy.mil.

FIELD OF THE INVENTION

The present invention pertains generally to microbial fuel cells. More specifically, the present invention pertains to devices for and methods to modify the surface of microbial fuel cell electrodes with biomolecules. The present invention is particularly, but not exclusively, useful as a method for establishing a surface graft matrix that allows for biomolecules and biological agents to be bound to the surface of carbon-based microbial fuel cells electrodes, to increase the energy generating potential of the microbial fuel cell.

BACKGROUND OF THE INVENTION

A fuel cell differs from a battery in that it is a thermodynamically open system where the fuel source reactant is continuously supplied from an external source. A microbial fuel cell uses the metabolic process of microbes (such as bacteria, for example) from the surrounding environment to convert chemical energy into electrical energy. More specifically, electrical charges are generated and expelled during the metabolic process of bacteria, which converts biological organic soil content, such as acetates, fatty acids, and aromatics, into by-products of carbon dioxide and positive hydrogen ions. Compared to traditional fuel cells, microbial fuel cells can be more flexible to operate and less expensive to construct.

For a microbial fuel cell to function more effectively, the generated charges must effectively transfer from the bacteria to the anode for the microbial fuel cell. Once this occurs, the charges can travel across and through the anode to either serve as an electric energy source to instantaneously power load electronics, or to charge storage devices such as batteries, capacitors, super capacitors and similar components. Energy (electrical charges, or electrons) that is not dissipated in the load electronics can continue to flow to the cathode, to chemically react with oxygen and positive ions and thereby create thermal energy and chemical by-products.

Graphite materials are predominantly used as fuel cell electrodes in sediment microbial fuel cells because they are inexpensive, electrically conductive, inert, and corrosion resistant. But the power performance of fuel cells comprised of these materials can be hindered because of a graphite system's inability to operate effectively in diverse operation conditions where pH, temperature, salinity, availability of organic matter, and buildup of oxidation products are issues. For this reason, other carbon-based materials such as nanotubes, rods, fibers, whiskers, sponges, fabric, expandable graphite, carbon black, graphene, and fullerenes are often used as material components for fuel cell electrodes in addition to graphite. Electrodes containing one or more of these types of carbon-based materials can show improved electrical conductivity, structural stability, and thermal stability when formulated and processed in an optimized manner when compared to electrodes that are made of pure graphite. These improved material properties can persist even after prolonged exposure to harsh and extreme operating conditions.

Studies in the prior art have also shown that in addition to durability, fuel cell performance can be enhanced by modifying the electrode material formulation. Sediment microbial fuel cells that are deployed in sandy and marine environments have been observed to provide power densities of 1.4-70 milliWatts per square meter ($mW/m^2$), which can be enough energy to operate low-powered sensors and devices. The prior art further discloses that anaerobic bacteria can drive the energy production process of sediment microbial fuel cells by metabolizing biological organic matter from the surrounding environment. Sediment microbial fuel cell anodes have been created from carbon cloth pouches filled with chitin or cellulose, which are insoluble biological compounds. The presence of biomolecules such as chitin or cellulose increased the maximum power density of the sediment fuel cells to 176-272 $mW/m^2$. The power density was also observed to increase as the particle size of chitin decreased. An increase in fuel cell operation time (up to 33 days) was also observed with the presence of chitin and cellulose. Thus, the prior art indicates that the presence of chitin and cellulose introduced an insoluble natural food source that quickly attracted anaerobic bacteria to the sediment fuel cell system, which is needed to drive and sustain the energy production process. As a result, the power performance of carbon-based sediment microbial fuel cells can be further enhanced with the presence of biological compounds.

In view of the above, it is an object of the present invention to provide a microbial fuel cell and methods for manufacture that provide a surface graft matrix that binds biologics (biomolecules and biological agents) to the electrode of a microbial fuel cell. Another object of the present invention is to provide a microbial fuel cell and methods for manufacture that provides an enhanced microbial environment for attracting anaerobic bacteria to metabolize biomolecules. Yet another object of the present invention is to provide a microbial fuel cell and methods for manufacture, which integrates a surface graft matrix that binds biological agents to the fuel cell to yield increased power output relative to similar-sized fuel cells. Still another object of the present invention is to provide a microbial fuel cell and methods for manufacture that maintains consistent power generation capacity, even in austere undersea environments. Another object of the present invention is to provide a microbial fuel cell and methods for manufacture that can be easily manufactured in a cost-effective manner.

SUMMARY OF THE INVENTION

A method for enhancing a microbial environment for a fuel cell can include the initial step of establishing reactive chemical functional groups on the outside surface of a carbon-based electrode (typically the anode) for the fuel cell. To do this, the chemically inert ($sp^2$ hybridized) carbon material, i.e., a carbon material with four single bonds, on the anode surface can be oxidized by washing the anode with a solution of 4-carboxybenzene diazonium tetrafluoroborate, followed by washing with acetone, methanol and water. Once this occurs, the anode surface can have functional reactive groups that include activated carboxyl groups.

Once the anode surface has been oxidized, the methods according to several embodiments, can include the step of binding a surface graft matrix to the reactive chemical functional groups (the activated carboxyl groups on the anode surface). In several embodiments, 1-Ethyl-3-(3-dimethylaminopropyl) carbodiimide (EDAC) and N-hydroxysuccinimide (NHS or sulfo-NHS can be used to establish a surface graft matrix, which binds to the activated carboxyl groups. The EDAC/sulfo-NHS surface graft matrix can have outer terminal reactive groups available for binding to biological molecules.

Once the surface graft matrix is established, the methods according to several embodiments, can include the additional step of covalently binding a biological substance to the outer terminal reactive groups of the surface graft matrix. In some embodiments, the biological substance used to accomplish this step can be a biological agent, which can be selected from the group consisting of bacteria, toxins, fungi, antigens and antibodies. In still other embodiments, the biological substance can be a biomolecule selected from the group consisting of polysaccharides, proteins, lipids, nucleic acids and enzymes. One such molecule is chitosan, which can be used in applications where the microbial fuel cell is to be positioned within a body of water for an extended period of time. Or, a combination of biomolecules and biological agents can be grafted to the surface graft matrix. In still other embodiments, multiples surface graft matrices can be used, with the biomolecules being attached to the surface graft matrices in various combinations.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
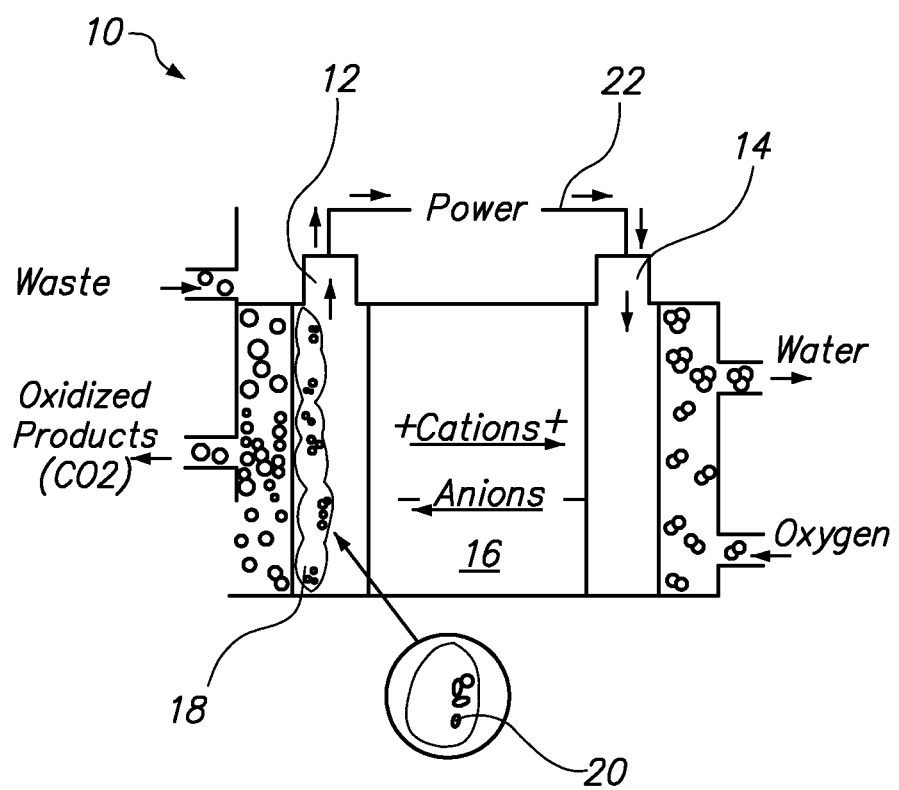
FIG. 1 is a schematic diagram of a microbial fuel cell of the present invention, which illustrates the general operation of the microbial fuel cell.

In brief overview, and referring initially to FIG. 1, a microbial fuel cell is shown and is initially designated by reference character 10. FIG. 1 illustrates a closed fuel cell. It should be appreciated, however, that the systems and methods according to several embodiments of the present can also be applied to open fuel cells. A microbial fuel cell 10 is a device that uses the catalytic reaction of microorganisms to convert chemical energy to electrical energy. As shown in FIG. 1, a typical microbial fuel cell can consist of an anode 12 and a cathode 14 that can be separated by a cation (positively charged ion) specific membrane containing electrolyte 16. At the anode 12, fuel 18 is oxidized by biological substances 20 such as microorganisms, which can generate electrons and protons. Electrons can be transferred to the cathode 14 through an external electric circuit 22, while protons can be transferred to the cathode through the membrane. As shown in FIG. 1, electrons and protons can also combine with oxygen to form water at cathode 14.

The carbon-based electrodes can be comprised of a polymer resin (thermoplastic or thermoset) infused with one or more carbon fillers. Carbon fillers can include graphite (natural and synthetic), expandable graphite, carbon black, carbon sponges, carbon cloth, and carbon nanoparticles such as nanotubes, fullerenes, rods, wires, and whiskers. The carbon-based electrodes may also be comprised solely of carbon fillers, which can be compressed into a plate-like design. In still other embodiments, a carbon-based electrode may be comprised of an inner core plate (metal, ceramic, or polymeric) encapsulated by an outer carbon-based layer. Catalysts may or may not be included in the formulation of the carbon-based electrode materials. In any case, the methods according to several embodiments can be performed on the outer surface of each of these embodiments.

Figure 2:
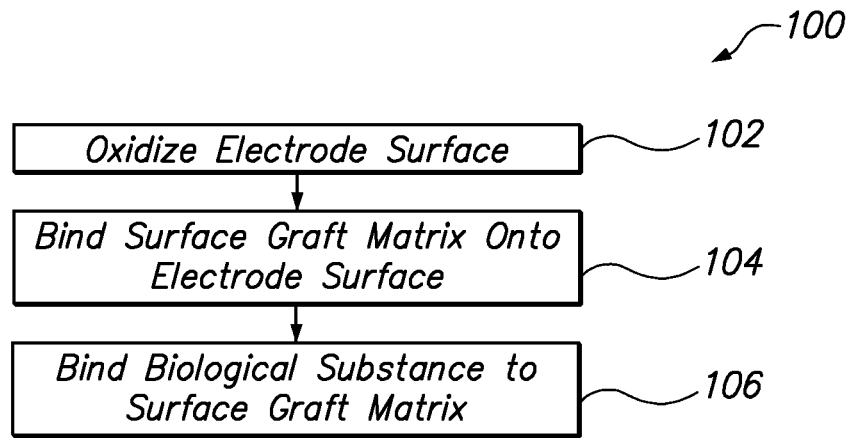
FIG. 2 is a block diagram detailing steps that can be taken to accomplish the methods according to several embodiments of the present invention.

The methods according to several embodiments of the present invention can enhance the power generation capability of microbial fuel cell 10. For some of these embodiments, and referring now to FIG. 2, a block diagram 100 is shown, which can be used to describe methods for bio-functionalizing a carbon-based electrode such as anode 12 in FIG. 1. The methods according to several embodiments can include the initial step 102 of oxidizing the surface of the carbon-based electrode, to ensure the presence of reactive chemical functional groups on the electrode (typically the electrode that can be bio-functionalized by oxidation is the anode 12 for the microbial fuel cell 10 according to several embodiments). The anode may already contain pendant functional groups or a chemical surface treatment may be performed to create the reactive chemical functional groups. The reactive groups will function as covalent binding sites for the cross linking agent or short chain polymers that will comprise the surface graft matrix, which is described more fully below.

In cases where a surface chemical treatment is required, i.e., for carbon-based electrodes where the surface of the carbon-based electrodes may be comprised of chemically inert carbons ($sp^2$ hybridized), the electrode surface must be oxidized to covalently attach the surface graft matrix. The oxidation step 102 can be accomplished using a number of methods. As illustrated in greater detail in FIG. 3, one method can use a solution of 4-carboxybenzene diazonium tetrafluoroborate (block 108) followed by subsequent washing steps with acetone (block 110), methanol (block 112), and water (block 114).

An alternative oxidation procedure can involve exposure to ozone, following by washing with 10-30% by weight hydrogen peroxide. Yet another embodiment for accomplishing the oxidation of carbon-based materials such as graphite can be Hummer's method. This procedure can use potassium permanganate ($KMnO_4$) in an acidic solution (pH<2) to drive the creation of carboxyl groups on graphitic carbon. Several different acids in appropriate concentration could be used, such as sulfuric acid, phosphoric acid, acetic acid, nitric acid, perchloric acid, or hydrochloric acid. In general, chlorine containing acids should be avoided to prevent evolution of chlorine gas; similarly nitric acid should be avoided to prevent nitric acid vapors. Sulfuric acid can be the traditional choice, though at high concentrations the combination of potassium permanganate and sulfuric acid will produce an unstable explosive material.

Referring back to FIG. 2, and as indicated by step 104, once the anode surface is oxidized, the second step for the methods according to several embodiments could be to covalently bind one or more cross linking agents, having one or more chemical functionalities, to the activated carboxylic acid groups on the surface of carbon-based electrode (anode 12), in order to create a surface graft matrix 24 (See also FIGS. 4-6) with outer terminal functional reactive groups. The surface graft matrix can be heterofunctional cross linking agents, short chain polymers or a poly-functional reagent. Biomolecules to be covalently bound to the surface graft matrix may include polysaccharides, proteins, lipids, nucleic acids, and enzymes. Biological agents that may also be covalently bound to the surface graft matrix may include a host of microorganisms such as bacteria, toxins, fungi, antigens, and antibodies.

Figure 4:
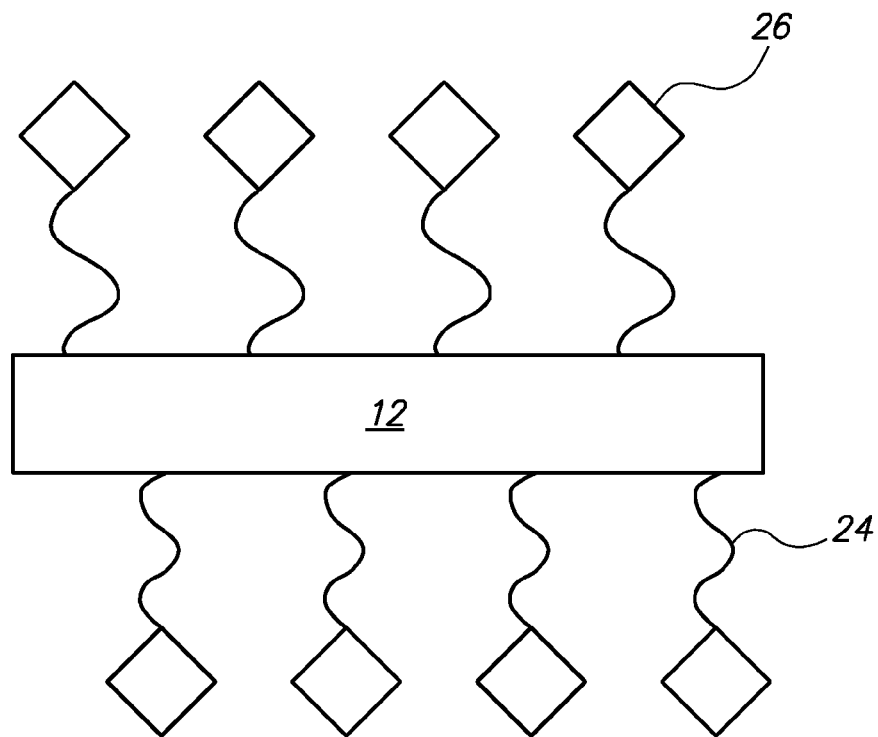
FIG. 4 is a schematic diagram of an anode for the microbial fuel cell of FIG. 1, according to several embodiments of the present invention.
Figure 5:
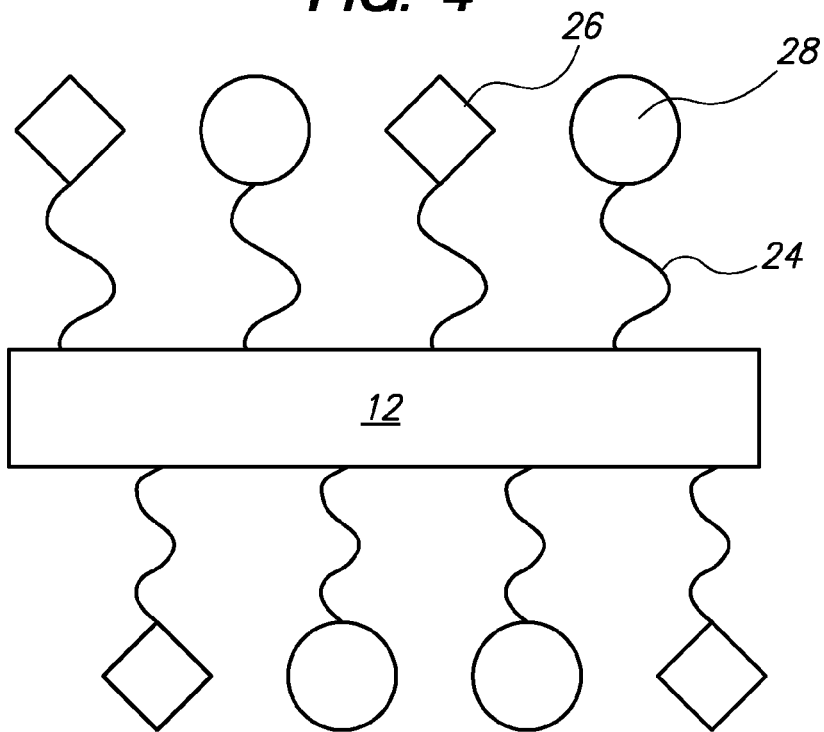
FIG. 5 is a schematic diagram of an alternate embodiment of the microbial fuel cell of FIG. 4; and, FIG. 6 is a schematic diagram of another alternate embodiment of the microbial fuel cell of FIG. 4.
Figure 6:
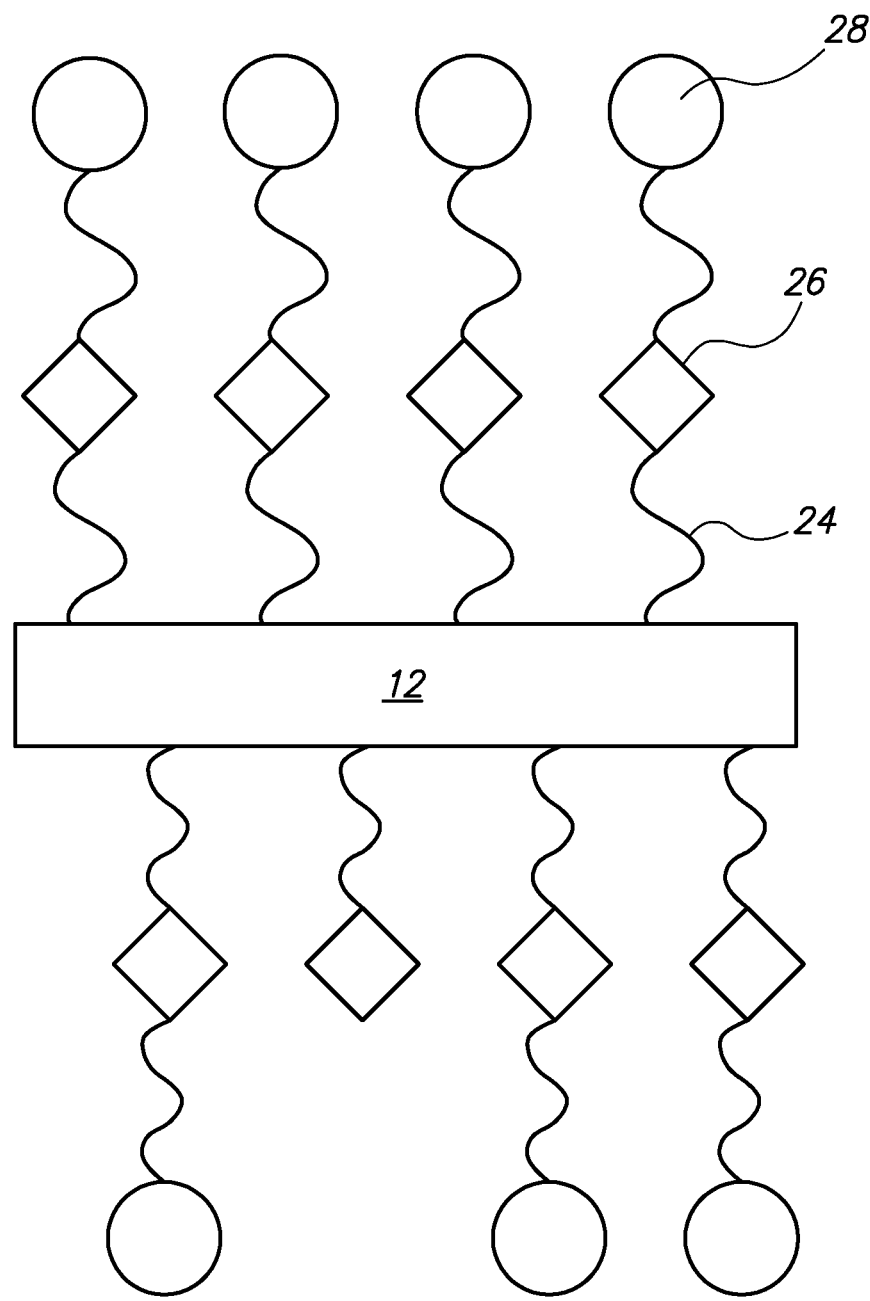

The final step for the methods according to several embodiments could be to covalently bind the biologic substance to outer terminal chemically reactive groups of the aforementioned surface graft matrix. As shown in FIGS. 4-6, the biologic substance could be a biomolecule 26, including but not limited to polysaccharides, proteins, lipids, nucleic acids and enzymes. Or, the biologic substance could be a biological agent such as bacteria, toxins, fungi, antigens and antibodies and the like.

Figure 3:
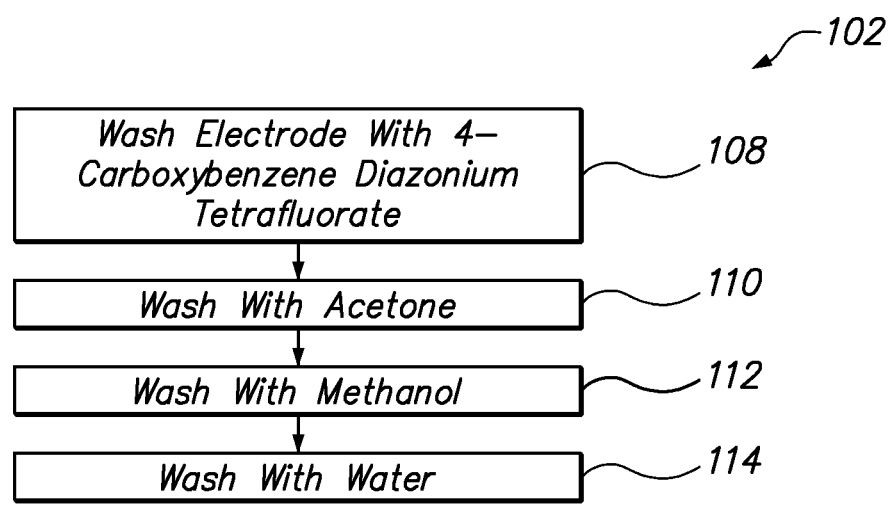
FIG. 3 is a block diagram detailing steps that can be taken to accomplish the oxidize electrode step shown in FIG. 2, according to several embodiments of the present invention.

FIG. 4 is a schematic cross-sectional diagram of one embodiment of the microbial fuel cell anode 12, according to several embodiments. As shown in FIG. 3, the surface graft matrix 24 is covalently bound to the carbon-based electrode 12 and biomolecules 26 can be covalently attached to the terminal end of the surface graft matrix. As shown in FIG. 5, additional steps may be inserted beyond this point which can result in an anode 12 that has both biomolecules 26 (diamonds) and biological agents 28 (circles) that are covalently bound to the surface graft matrix 24. This configuration can be accomplished by covalently binding the surface graft matrix 24 to the biomolecule 26 in one step and subsequently exposing the bio-modified electrode to the biological agent 28 in a separate step.

FIG. 6 shows still another embodiment, which can comprise a biomolecule 26 and biological agent 28 that can be covalently bound to one or more surface graft matrices 24. To obtain the design of FIG. 6, a surface graft matrix can be covalently bound to the carbon-based electrode (anode 12), followed by binding the biomolecule to the surface graft matrix 24. Subsequently, a second surface graft matrix layer 24 can be formed that is either identical to the initial layer or of different chemical composition. The biological agent 28 can then be covalently bound to the second surface graft matrix layer or bound to unreacted surface grafts of the initial graft layer.

For undersea applications, it may be advantageous to establish a microbial environment where chitosan can be the biological substance 20 that is used as the biomolecule that can be bound to the microbial fuel cell 10 for increased performance. An exemplary, non-limiting procedure for covalent binding of a biomolecule such as chitosan to a graphitic carbon-based electrode surface for anode 12 of microbial fuel call 10 can be described below.

Oxidation

A simplified version of Hummer's method can be used to create carboxyl attachment sites on the surface of carbon-based electrode surfaces (i.e. oxidize the surface of anode 12 in accordance with step 102). To do this, slowly add concentrated sulfuric acid to deionized water to produce a 3 molar dilute solution of sulfuric acid in an acid-safe container that is large enough to completely submerge the carbon-based microbial fuel cell anode 12. Next, slowly dissolve an appropriate amount of potassium permanganate ($KMnO_4$) so that the concentration of $KMnO_4$ in the sulfuric acid solution is approximately 100 mM. Once dissolved, carefully place the carbon-based material in the acid/permanganate solution bath so that it is fully submerged in the solution. The color of the electrode should immediately darken. To maintain a high surface conductivity, remove the electrode from the acid/permanganate solution bath after 1 to 30 seconds in the bath. To obtain a more dense surface coverage of carboxyl attachment sites, remove the electrode after being submersed for 1 minute. Additionally, this reaction can be decelerated by placing the container with the acid/permanganate solution bath in an ice water bath; however, this is not necessary. After oxidation, rinse the carboxyl-modified carbon-based material with deionized water and proceed to biochemical functionalization (step 104 for the methods according to several embodiments).

Biochemical Functionalization

For this embodiment, the target biofunctionalization chemistry can be a standard biochemical process using 1-Ethyl-3-(3-dimethylaminopropyl)carbodiimide (EDAC) and sulfo N-Hydroxy-succinimide (s-NHS) to covalently bind chitosan to the surface of the oxidized carbon-based electrode. The first step of biochemical functionalization is activation of the carboxyl groups on the surface of the carbon-based electrode with EDAC to produce a chemically unstable amine-reactive O-acylisourea intermediate. The unstable intermediate is then stabilized using s-NHS to produce a semi-stable amine-reactive s-NHS ester intermediate. Chitosan can then react with the resulting unstable amine-reactive O-acylisourea intermediate or remaining semi-stable amine-reactive s-NHS ester intermediate to covalently bind to the carbon-based anode. This can be done using any of the publicly available EDAC/s-NHS protocols for carboxyl activation. One version of such a protocol follows:

In a container large enough to completely submerge the carbon-based electrode, create a room temperature solution of 2 mM EDAC (1-Ethyl-3-(3-dimethyl-aminopropyl)carbodiimide) and 5 mM s-NHS (sulfo N-Hydroxysuccinimide) in pH 6 MES buffer solution (0.1 M 2-(N-Morpholino)ethanesulfonic acid (MES) sodium salt, 0.5 M sodium chloride, pH adjusted to 6.0 with hydrochloric acid). Once the contents have dissolved into a solution, immediately submerge the carbon-based electrode in the solution for at least 15 minutes. After activation, rinse the electrode sparingly with deionized water.

To attach the chitosan, create a 10 mM solution of chitosan in water (or MES buffer solution) in a container large enough to submerge the electrode. Submerge the carbon-based electrode previously modified with EDAC/s-NHS in the chitosan solution and allow chitosan to react with terminal semi-stable amine reactive NHS-esters for at least 2 hours. If the concentration of the chitosan solution is less than 10 mM, then the electrode can be allowed to react in the solution for a longer period of time but not to exceed 12 hours. Finally, remove chitosan-modified carbon-based electrode from the solution, rinse once with deionized water, and store appropriately.

The new feature of the described invention is the use of carbon-based materials with surface grafted biomolecules to increase the power performance of sediment microbial fuel cells. Since graphitic carbon ($sp^2$ hybridized) is chemically inert, carbon-carbon covalent bonds must be broken to enable practical surface chemistry. Breaking graphitic carbon bonds can also render the material electrically insulating. Therefore, a balance must be struck between chemical activity and electrical conductivity. Performing chemical surface treatments is a viable solution to maintain this balance: chemical modifications can be performed on the substrate immediately exposed to the environment while observing no appreciable decrease in the bulk electrical conductivity.

The ability to produce specialized biological electrode substrates using the described method enables highly adaptable sediment microbial fuel cell systems with interchangeable electrodes specifically designed to perform in distinct operation conditions and environments. In comparison to the prior art, where bulk quantities of biological compounds such as chitin and cellulose were placed in the vicinity of the anode, surface grafting of biomolecules creates greater surface area exposure of the biological compounds. An increase in surface area of the biological compounds bound to the surface of a carbon-based electrode allows for microbial fuel cells 10 of reduced size and weight, while exhibiting power generation and durability properties that are comparable or superior to bulkier microbial fuel cells. The described method also creates a way to covalently bind biological microorganisms to the carbon-based electrode surface. Furthermore, covalent binding of biomolecules to the surface of carbon-based electrodes can improve the operation capability of sediment microbial fuel cells in diverse environments by enabling the attraction of targeted anaerobic bacteria to the electrode surface.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for enhancing a microbial environment for a microbial fuel cell, said microbial fuel cell having at least one carbon-based electrode, said method comprising the steps of:
   A) oxidizing said at least one carbon-based anode that is made of a chemically inert ($sp^2$ hybridized) carbon material to establish reactive chemical functional groups on the surface of said at least one carbon-based anode, said oxidizing step being accomplished by;
      A1) washing said anode with a solution of 4-carboxybenzene diazonium tetrafluoroborate;
      A2) washing the results of said step A1) with acetone;
      A3) washing the results of said step A2) with methanol;
      A4) rinsing the result of said step A3) with water;
   B) binding a surface graft matrix to said reactive chemical functional groups, said surface graft matrix having outer terminal functional reactive groups; and,
   C) covalently binding a biological substance to said outer terminal functional reactive groups.

2. The method of claim 1 wherein said biological substance used to accomplish step C) is a biological agent selected from the group consisting of bacteria, toxins, fungi, antigens and antibodies.

3. The method of claim 1 wherein said biological substance used to accomplish step C) is a biomolecule selected from the group consisting of polysaccharides, proteins, lipids, nucleic acids and enzymes.

4. The method of claim 1, wherein said step B) is accomplished using EDAC and Sulfo-NHS.

5. The method of claim 4, wherein said step C) is accomplished using chitosan.

6. A method for increasing microbial fuel cell power generation, said microbial fuel cell having an carbon-based anode and a cathode, said method comprising the steps of:
   A) establishing reactive chemical functional groups on a surface of said carbon-based anode, said establishing step being accomplished by;
      A1) washing said anode with a solution of 4-carboxybenzene diazonium tetrafluoroborate;
      A2) washing the results of said step A1 with acetone;
      A3) washing the results of said step A2 with methanol;
      A4) rinsing the result of said step A3) with water;
   B) binding a surface graft matrix to said reactive chemical functional groups, said surface graft matrix having outer terminal reactive groups; and,
   C) covalently binding a biological substance to said matrix outer terminal functional reactive groups, said biological substance being selected from the group consisting of bacteria, toxins, fungi, antigens and antibodies.

7. The method of claim 6 wherein said biological substance used to accomplish said step C) is a biomolecule selected from the group consisting of polysaccharides, proteins, lipids, nucleic acids and enzymes.

8. The method of claim 6, wherein said anode from said step A) is made of a chemically inert ($sp^2$ hybridized) carbon material.

9. The method of claim 6, wherein said step B) is accomplished using EDAC and Sulfo-NHS.

10. The method of claim 9, wherein said step C) is accomplished using chitosan.

* * * * *